(12) United States Patent
Shipton

(10) Patent No.: US 6,873,663 B1
(45) Date of Patent: Mar. 29, 2005

(54) RECEPTION OF M-ARY PSK-MODULATED SIGNALS

(75) Inventor: Gary Shipton, Lund (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/504,746

(22) Filed: Feb. 16, 2000

(51) Int. Cl.$^7$ ............................................. H04L 27/22
(52) U.S. Cl. ..................................... 375/329; 375/229
(58) Field of Search ................................ 375/329, 322, 375/323, 324, 340, 229

(56) References Cited

U.S. PATENT DOCUMENTS

| | | | |
|---|---|---|---|
| 4,777,640 A | | 10/1988 | Turner et al. |
| 5,111,202 A | | 5/1992 | Rivera et al. |
| 5,481,564 A | * | 1/1996 | Kakuishi et al. ............ 375/230 |
| 5,533,064 A | * | 7/1996 | Ichihara ...................... 375/340 |
| 5,870,439 A | | 2/1999 | Ben-Efraim et al. |
| 5,886,573 A | | 3/1999 | Kolanek |
| 5,949,821 A | | 9/1999 | Emami et al. |
| 6,009,317 A | | 12/1999 | Wynn |

FOREIGN PATENT DOCUMENTS

| | | |
|---|---|---|
| EP | 0032253 B1 | 7/1981 |
| EP | 0320058 A2 | 6/1989 |
| EP | 0519891 A2 | 12/1992 |
| EP | 0526836 A2 | 2/1993 |
| WO | WO95/10909 | 4/1995 |

* cited by examiner

Primary Examiner—Khai Tran
Assistant Examiner—David B. Lugo
(74) Attorney, Agent, or Firm—Potomac Patent Group PLLC

(57) ABSTRACT

A phase shift keying (PSK) receiver includes a limiter and a first receive filter. In order to compensate for distortion introduced by the limiter, the amplitude limited signal is subjected to equalization prior to being supplied to the first receive filter. Equalization is performed by receiving a digital input signal representing an output of the limiter, estimating an amplitude modulation component as a function of the digital input signal, and generating the equalized signal by modifying the digital input signal as a function of the estimated amplitude modulation component. The amplitude modulation component may be estimated by generating a filtered signal by filtering the digital input signal in accordance with a filtering characteristic that is substantially identical to a filtering characteristic of the first receive filter, and then generating the amplitude modulation component by measuring the amplitude of the filtered signal. The amplitude modulation component then serves as a basis for modulating the digital input signal, thereby approximately restoring amplitude modulation components that were lost by the limiter.

44 Claims, 5 Drawing Sheets

RECEPTION OF M-ARY PSK-MODULATED SIGNALS

BACKGROUND

The present invention relates to communication techniques, and more particularly to the reception of M-ary phase shift keying modulated signals.

Phase shift keying (PSK) is a well known technique for modulating a carrier signal by a digital information signal. In PSK modulation, binary data representing the information to be communicated is used to control the switching of the phase of a carrier signal between two or more values. For example, in Quaternary PSK (QPSK) modulation, binary information may be taken two bits at a time to control the switching of the phase of a carrier signal between four values, each corresponding to one of the four possible values of the two bits. More generally, the use of PSK to encode M possible values at a time is referred to as M-ary PSK.

PSK systems may be designed that assign each of the possible absolute phase values to one of the possible information values. In a well-known variant, called Differential PSK (DPSK), the system instead responds to changes in phase by comparing a prevailing phase with a preceding phase.

In any of the above PSK-based systems, demodulation of a received (D)PSK-modulated signal requires that the phase of the signal be detected, and that the corresponding informational content be determined. FIG. 1 illustrates a conventional PSK modulation transmitter 101 and receiver 103. On the transmitter side, a PSK modulator 105 generates a PSK-modulated signal, and supplies this to a transmit filter 107. The transmit filter 107 eliminates out of band components of the PSK-modulated signal, and supplies the resultant signal to an digital-to-analog (D/A) converter 109. The analog signal supplied at the output of the D/A converter 109 is supplied to a rst input of a mixer 111. A local oscillator (LO) 113 supplies a carrier frequency to a second input of the mixer 111. The up-converted signal supplied at the output of the mixer 111 is then supplied to a channel 115 (e.g., an air interface) that propagates, the signal to the receiver 103.

In the receiver 103, the signal supplied by the channel 115 is fed to a first input of a mixer 117. A mixer signal supplied by a local oscillator 119 to a second input of the mixer 117 causes an intermediate frequency (IF) signal to be supplied at the output of the mixer 117. The IF signal is supplied to a combined filter 121 that performs two functions. First, the combined filter 121 performs an IF filtering function, represented by the IF filter 123. The IF filter 123 is a selectivity filter whose purpose is to pass the wanted signal without distortion and to reject unwanted out of band signals.

The combined filter 121 also performs a receiver (RX) filtering function, represented by the RX filter 125. The RX filter 125 provides matched filtering to complement that of the transmit filter 107 and may have, for example, a root-cosine response.

The filtered signal generated at the output of the combined filter 121 is supplied to a limiter amplifier 127 (henceforth referred to simply as a "limiter" 127). The limiter 127 changes the generally sinusoidal signal, supplied at its input, into a signal of a repetitive substantially square waveform having two very precisely defined zero crossing points per cycle. The purpose of the limiter 127 is to limit the dynamic range of the signal to be processed. For example, as the distance between the receiver 103 and transmitter 101 varies, the magnitude of the received signal strength may also vary inversely, causing a very wide dynamic range. Use of a limiter 127 is one way of reducing this dynamic range. As an alternative to the limiter 127, an Automatic Gain Control (AGC) circuit could be used for this purpose.

The output of the limiter 127 is then supplied to an analog-to-digital (A/D) converter 129, which generates therefrom a corresponding series of digital values, which are supplied to a PSK demodulator 131. The PSK demodulator 131 uses the supplied digital values to reconstruct the underlying binary information that was transmitted by the transmitter 101.

In conventional systems, all components except for the PSK modulator 105, transmit filter 107 and PSK demodulator 131 are implemented as analog technology. However, in practice the combined filter 121 is difficult to implement as an analog component—its performance deviates from the ideal due to the finite approximation used in realizing the required data shaping (e.g., root raised cosine) and because of variations of the shaped pass-band that result from such factors as manufacturing process, temperature, power supply, matching, frequency offset and the like.

These difficulties could be overcome by using digital rather than analog technology to implement the RX filter 125. It is therefore desirable to provide a (D)PSK receiver in which the functions of the RX filter 121 are performed in the digital domain.

SUMMARY

In accordance with one aspect of the present invention, the foregoing and other objects are achieved in a phase shift keying (PSK) receiver that includes a limiter and a first receive filter. In order to compensate for distortion introduced by the limiter, the amplitude limited signal is subjected to equalization prior to being supplied to the first receive filter. Equalization is performed by receiving a digital input signal that represents an output of the limiter, and estimating an amplitude modulation component as a function of the digital input signal. The equalized signal may then be generated by modifying the digital input signal as a function of the estimated amplitude modulation component.

In another aspect of the invention, estimating the amplitude modulation component as a function of the digital input signal may be accomplished by generating a filtered signal by filtering the digital input signal in accordance with a filtering characteristic that is substantially identical to a filtering characteristic of the first receive filter, and then generating the estimated amplitude modulation component by measuring the amplitude of the filtered signal.

In yet another aspect of the invention, the estimated amplitude modulation component may further be modified by supplying it to a non-linearity circuit. The output of the non-linearity circuit may then be used to generate the equalized signal by modulating the digital input signal.

BRIEF DESCRIPTION OF THE DRAWINGS

The objects and advantages of the invention will be understood by reading the following detailed description in conjunction with the drawings in which.

DETAILED DESCRIPTION

Figure 1:
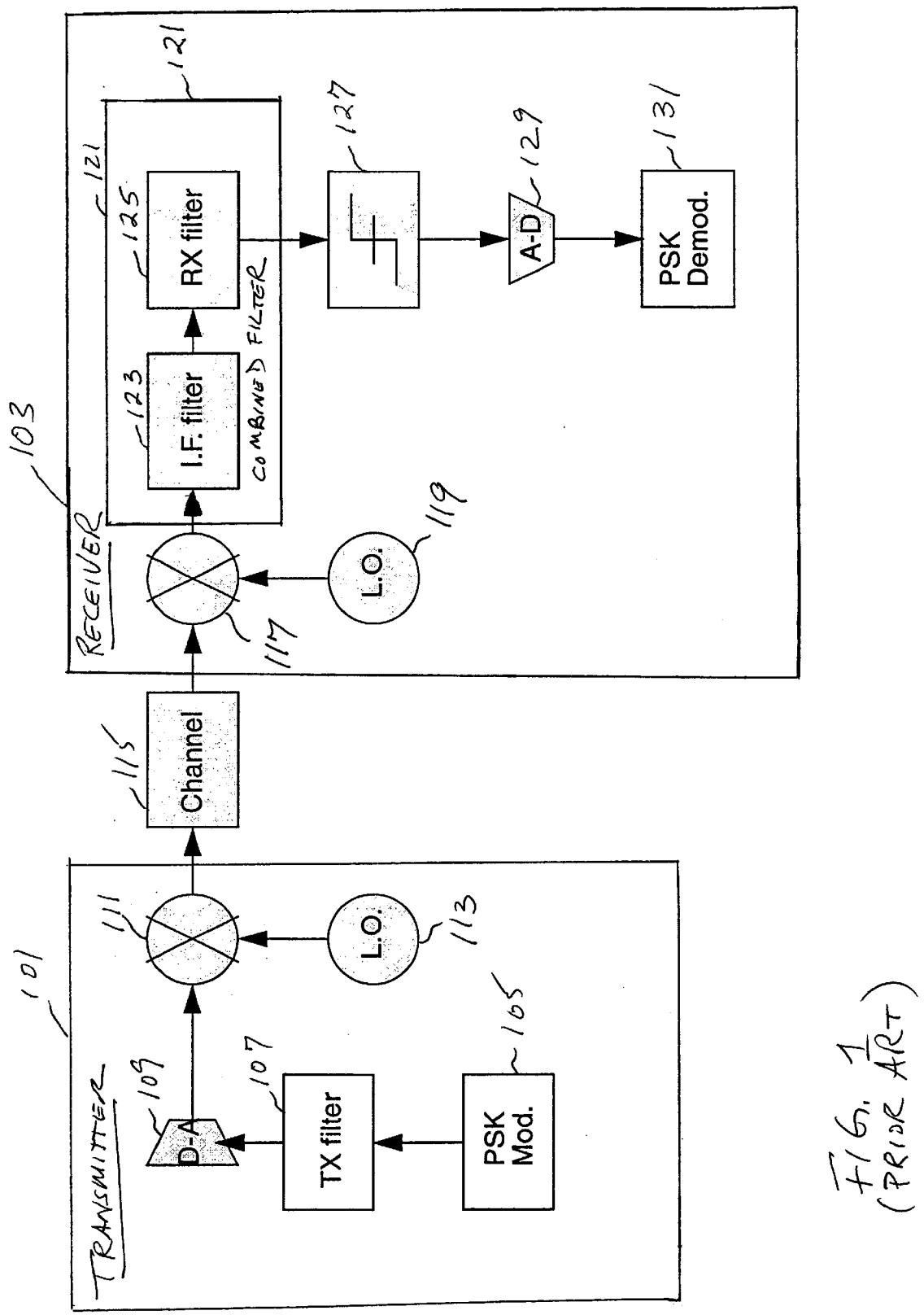
FIG. 1 is a block diagram of a conventional PSK modulation transmitter and receiver.
Figure 2:
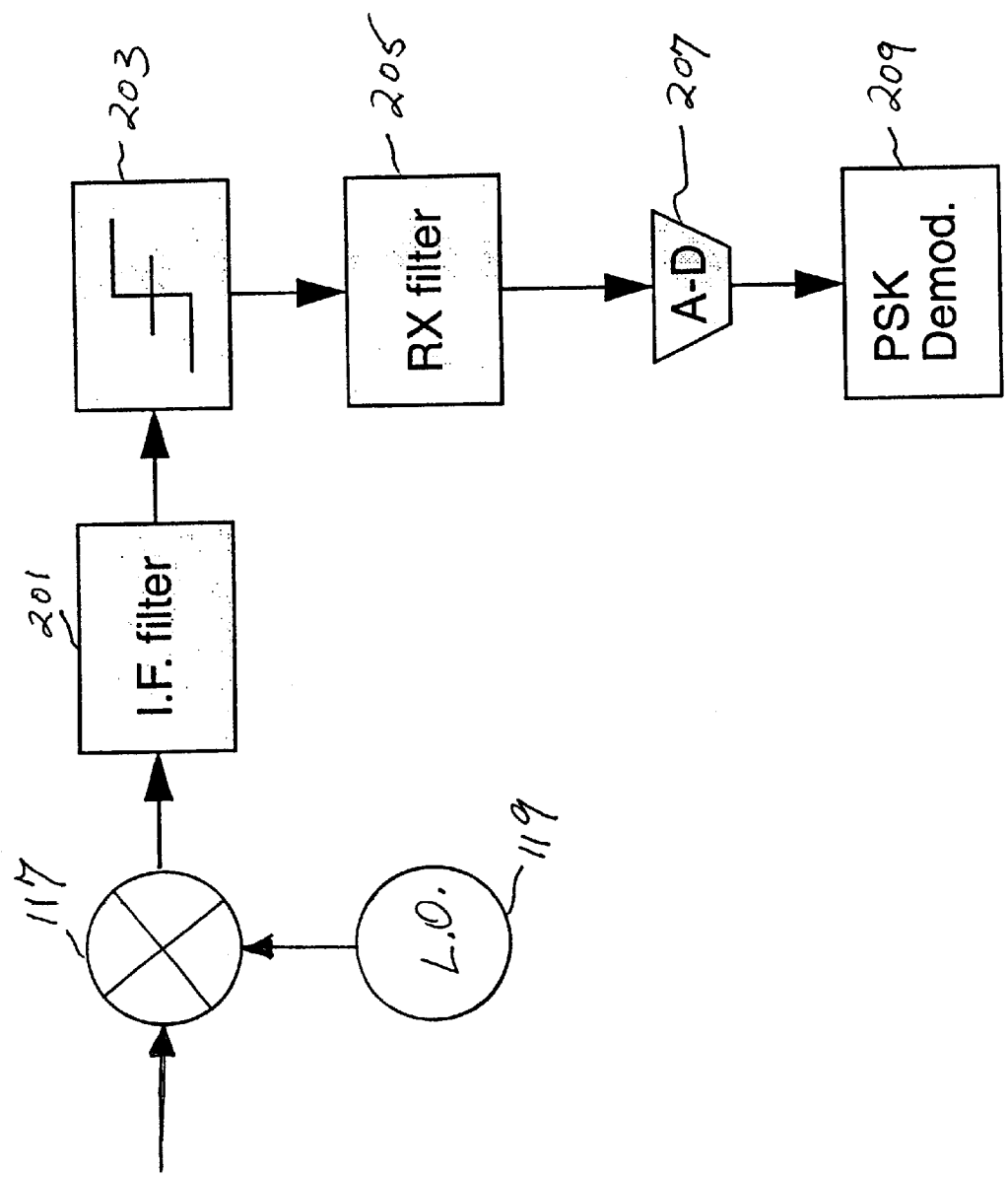
FIG. 2 is a block diagram of a receiver arrangement that simplifies the design of the IF filter and the RX filter.

The various features of the invention will now be described with respect to the figures, in which like parts are identified with the same reference characters As mentioned earlier, it is desirable to provide a (D)PSK receiver in which the functions of the RX filter 121 (see FIG. 1) are performed in the digital domain. This is not a straightforward task. For example, the components of the receiver could be rearranged as shown in FIG. 2. Here, the IF signal presented at the output of the mixer 117 is supplied to an IF filter 201 that is not combined with the RX filter. The output of the IF filter 201 is supplied to a limiter 203, which in turn supplies its output signal to a separate RX filter 205. The output of the RX filter 205 is supplied to an A/D converter 207. The digital signal provided at the output of the A/D converter 207 is then supplied to a PSK demodulator 209.

Figure 3:
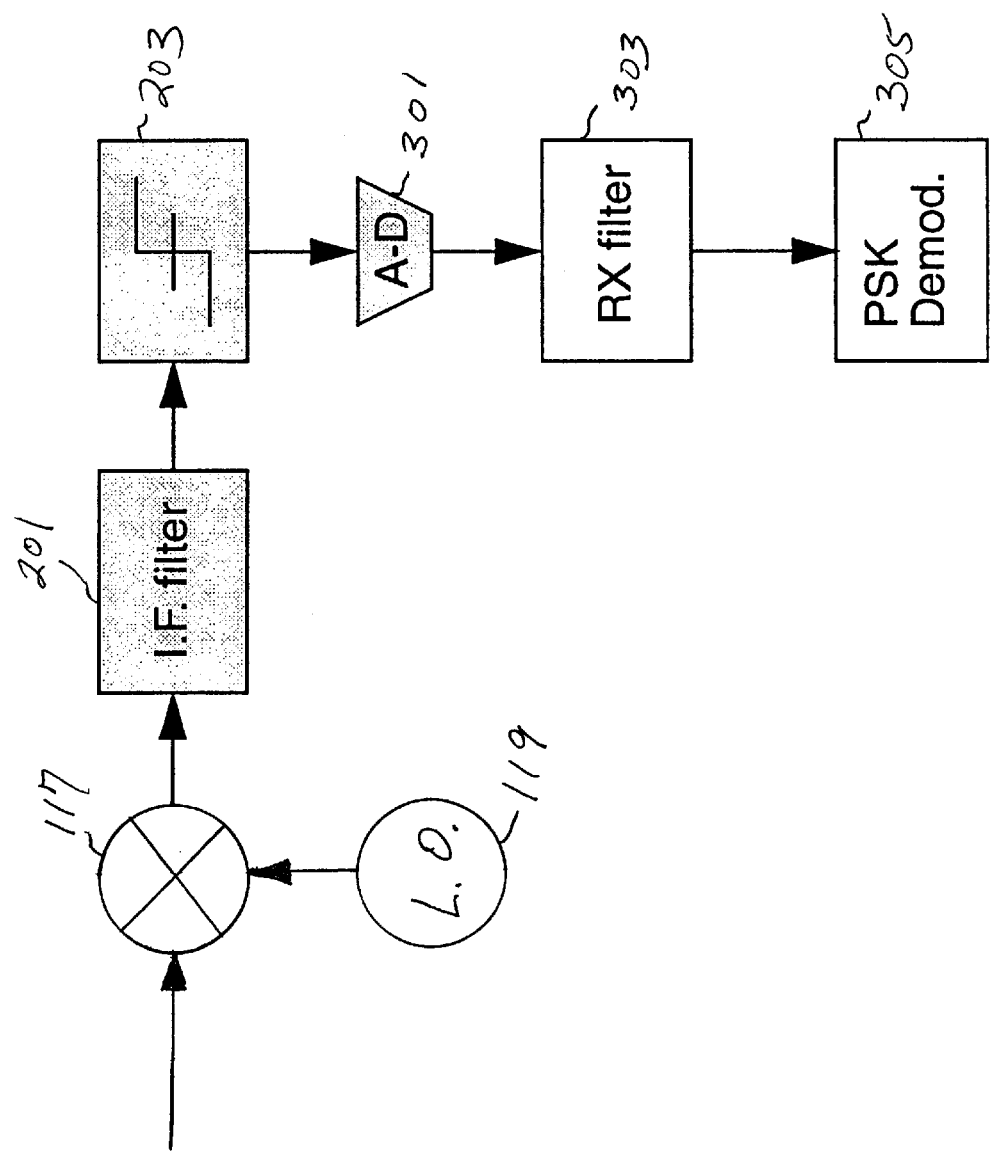
FIG. 3 is a block diagram of an alternative receiver arrangement that permits the RX filter to be implemented digitally.

In the arrangement of FIG. 2, only the PSK demodulator 209 can be implemented digitally. However, separation of the IF filter 201 and the RX filter 205 simplifies the overall design of the IF filter 201 and also simplifies the design of the RX filter 205 because dynamic range requirements are eased. By further rearranging the components as shown in the block diagram of FIG. 3, the RX filter can be implemented digitally as well. The arrangement of FIG. 3 differs from that of FIG. 2 in that an A/D converter 301 is situated upstream of an RX filter 303. The digital signal generated by the A/D converter 301 is then supplied to the RX filter 303, which in turn supplies its output signal to a PSK demodulator 305. In FIG. 3, the output of the limiter 203 is depicted being supplied directly to the A/D converter 301. However, there need not be a direct connection between these two components. For example, an anti-aliasing filter (not shown) could be interposed between the limiter 203 and the A/D converter 301.

Figure 4:
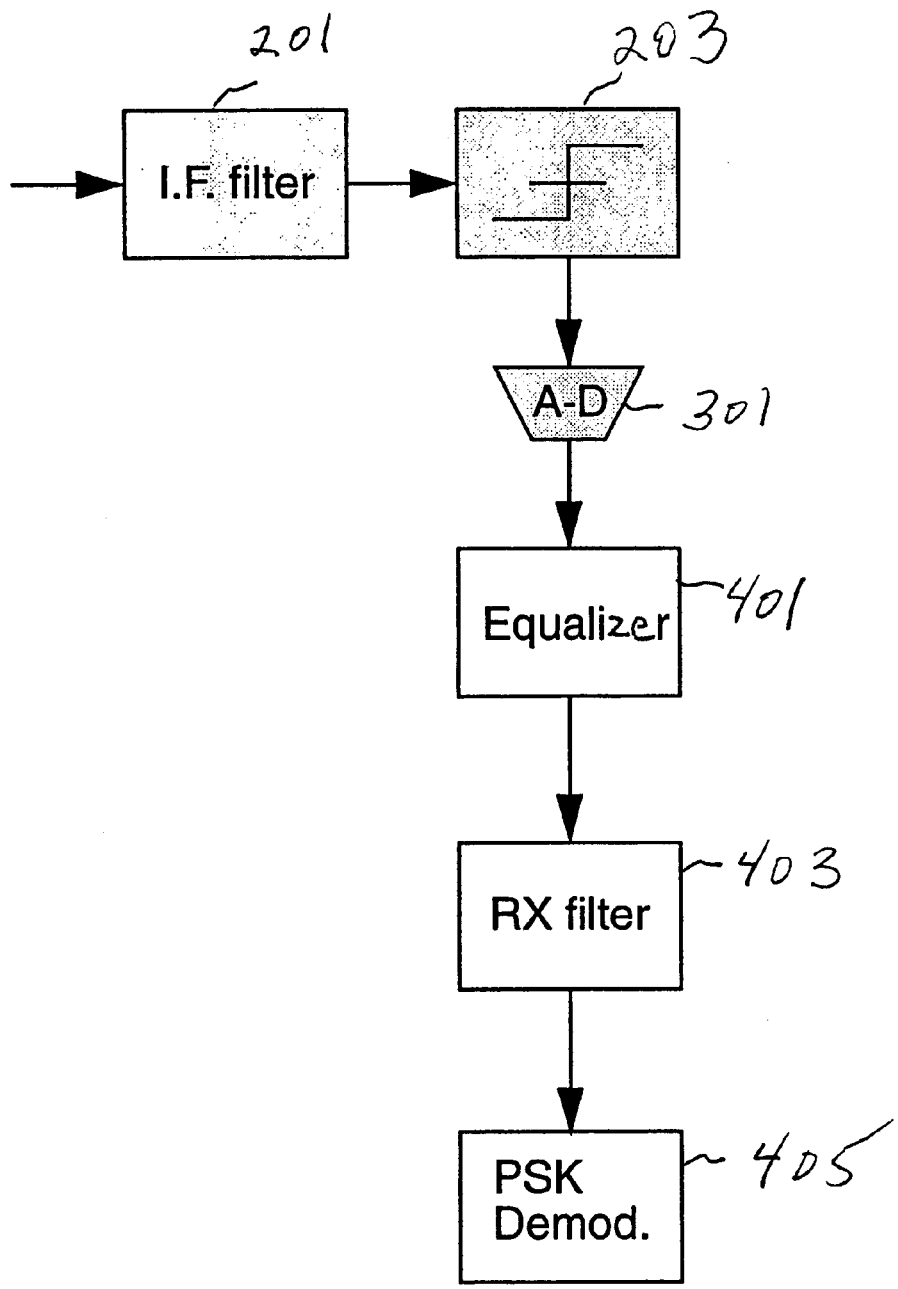
FIG. 4 is a block diagram of a receiver arrangement in accordance with an aspect of the invention.

It is desirable to use the arrangements of FIGS. 2 and 3 as the basis for a receiver design. However, neither of these arrangements performs well without further modification because the receiver no longer provides a matched filter. This problem is addressed in the receiver design depicted in FIG. 4. As shown in FIG. 4, the IF filter 201, limiter 203, and A/D converter 301 are connected in series, just like the arrangement of FIG. 3. However, in accordance with one aspect of the invention, an equalizer 401 is introduced that receives the digital signal supplied by the A/D converter 301. The purpose of the equalizer 401 is to correct for limiter distortion. More particularly, by eliminating amplitude modulation components, the limiter 203 introduces spectral spreading of the limited signal. If this spread signal were passed through a narrow band filter directly, important information would be eliminated, thereby introducing distortion in the PSK demodulated signal. The equalizer 401 compensates for this by reducing the spectral spreading of the limited signal.

Having reduced the spreading of the limited signal, the equalizer 401 then supplies its output to an RX filter 403, whose output is in turn supplied to a PSK demodulator 405.

Figure 5:
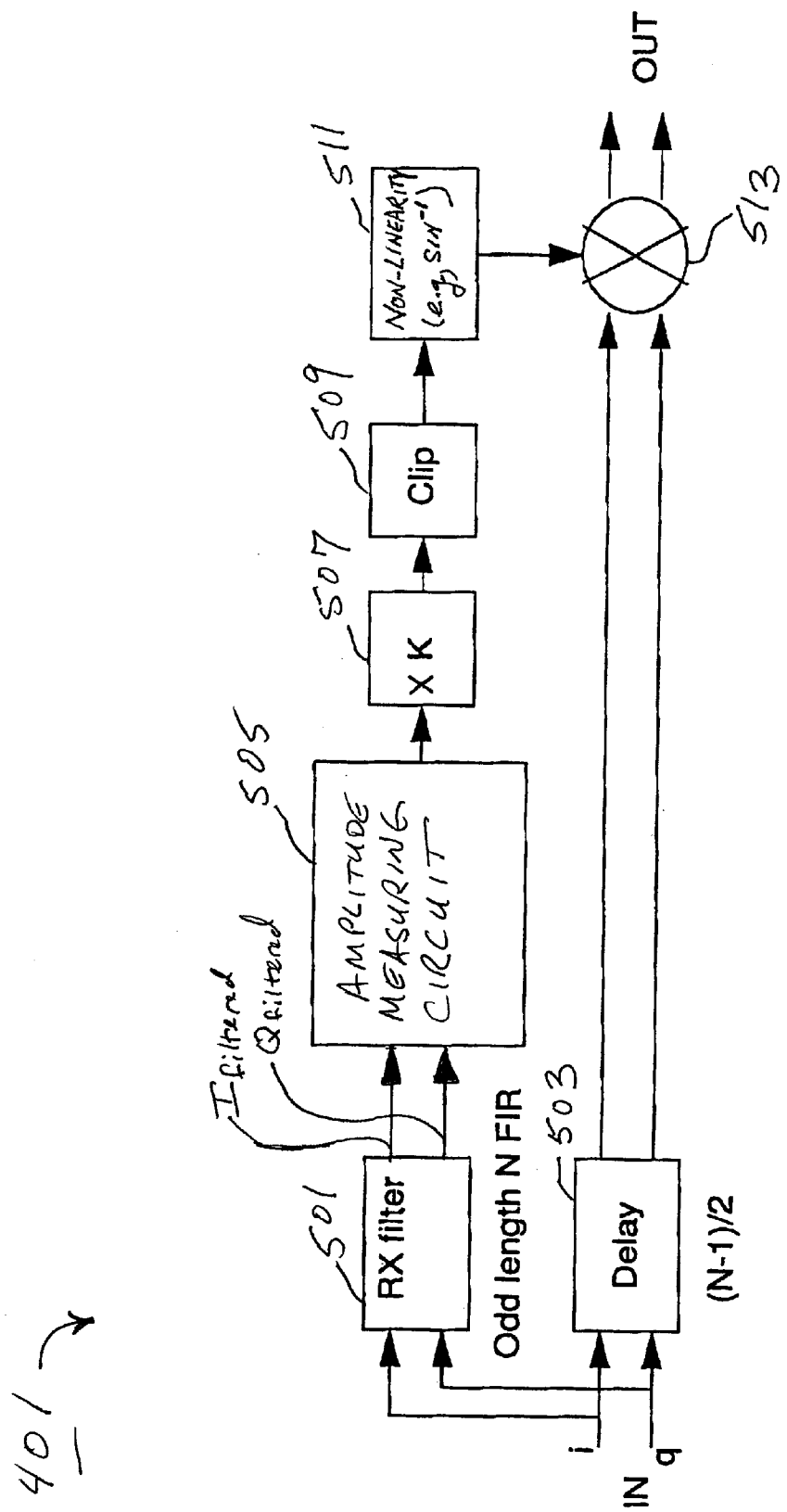
FIG. 5 is a block diagram of an equalizer for use in a receiver in accordance with an aspect of the invention.

An exemplary one of a number of designs of the equalizer 401 is shown in greater detail in FIG. 5. A signal presented at the equalizer input (IN) is simultaneously supplied to an RX filter 501 and to a delay circuit 503. The signal may be in the form of separate in-phase (I): and quadrature phase (Q) signal component's. The RX filter 501 is designed to be a copy of the receiver's shaping filter (e.g., the RX filter 403, which may be a root raised cosine filter). The output of the RX filter 501 is supplied to a signal amplitude measuring circuit 505. The amplitude measuring circuit 505 provides amplitude signals that are proportional to the amplitude of the filtered signal. The amplitude signals may, for example, be determined in accordance with:

$$\text{Amplitude} = (I^2_{filtered} + Q^2_{filtered})^{0.5},$$

where $I_{filtered}$ and $Q_{filtered}$ are the in-phase and quadrature phase components of the filtered signal presented at the output of the RX filter 501.

Alternatively, amplitude signals my be determined in accordance with:

$$\text{Amplitude} = Abs(I^2_{filtered}) + Abs(Q^2_{filtered}),$$

where Abs(x) denotes the absolute value of x. In this alternative embodiment, only an approximation of the amplitude is obtained. This embodiment has the advantage of reduced computational complexity, but this is achieved at the expense of reduced quality of performance.

The amplitude signals supplied at the output of the signal amplitude measuring circuit 505 are supplied to a multiplier 507, which multiplies its input by a constant K. In preferred embodiments, the multiplied signal supplied at the output of the multiplier 507 is in turn supplied to a clipping circuit 509 which prevents the magnitude of the multiplied signal from exceeding predefined values. The output of the clipping circuit 509 is then supplied to a non-linearity circuit 511 (i.e., a circuit having a non-linear transfer function), which may, for example, be an arcsin non-linearity circuit. Other non-linear functions could be used in place of the arcsin function in the non-linearity circuit 511. The output of the non-linearity circuit 511 is supplied to a first input of an amplitude modulator 513. In the exemplary embodiment, the purpose of the clipping circuit 509 is to prevent the input to the non-linearity circuit 511 from being anywhere outside the range of −1 to +1 (the arcsino function is undefined outside of this range). The constant K is preferably adjusted so that in the steady state (i.e., when an unmodulated carrier is being received), the output of the non-linearity circuit 511 has a value of "1". Since both the gain of the RX filter 501 and the input signal amplitude are fixed (the latter being due to the effect of the limiter 203), K is also fixed.

The non-linearity circuit 511 may be implemented as a lookup table. In embodiments using non-linear functions such as arcsin, the non-linearity circuit 511 need only accept values in the range 0 to +1, since in the preferred embodiment the output of the amplitude measuring circuit 505 will not be a negative number.

A second input of the amplitude modulator 513 receives the delayed input signal (both the I and Q components), supplied at the output of the delay circuit 503. The delay circuit 503 is designed to compensate for the processing delay associated with the RX filter 501. Preferably, the RX filter 501 should be generally symmetric. Where the RX filter 501 is an odd length N finite impulse response (FIR) filter, the delay circuit 503 preferably delays the input signal by an amount equal to (N−1)/2. The output of the amplitude modulator 513 is the output of the equalizer 401.

In the frequency domain, it is seen that the limiter 203 introduces spectral spreading of the wanted signal in addition to the generation of odd harmonics. It is the attenuation of these sidebands by the RX filter 403 that results in performance loss. The equalizer 401, in approximately restoring the amplitude modulation of the transmitted signal, has the effect of reducing the spectral spreading, thus decreasing the performance loss (i.e., the resultant signal with reduced spectral spreading can be passed through a narrowband filter substantially without the loss of information). The equalizer 401 is therefore designed to estimate the missing amplitude modulation (which is removed by the limiter 203) and to approximate a restoration of this by amplitude modulating the limited signal. In this case, only the envelope is important—the absolute carrier level is unimportant. The amplitude estimate may be made by the RX filter 501 in conjunction with the non-linearity circuit 511, which takes into account the circular nature of the phase modulation.

In alternative embodiments, the non-linearity circuit 511 may be omitted. In these embodiments, the multiplier 507 and clipping circuit 509 may be omitted as well. In such embodiments, the equalizer 401 still works, but with reduced F performance.

By introducing an equalizer 401 in an arrangement such as that depicted in FIG. 4, a simplified IF filter 201 can be used in the receiver. This can result in many benefits, including reduced silicon area requirements, reduced process sensitivity, improved overall performance, and reduced power consumption.

The invention has been described with reference to a particular embodiment. However, it will be readily apparent to those skilled in the art that it is possible to embody the invention in specific forms other than those of the preferred embodiment described above. This may be done without departing from the spirit of the invention. For example, the exemplary embodiment is described as comprising a number of "circuits." While any or all of these may be in the form of hardwired analog and/or digital components, any or all of these circuits may alternatively be implemented in the form of a programmable processor executing a suitable set of program instructions. The invention may also be considered to be embodied in the form of a computer readable storage medium having stored therein signals representative of the suitable set of program instructions.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating an equalized signal to be supplied to a first receive filter in a receiver, wherein the receiver includes an amplitude limiter and the first receive filter, the method comprising:

receiving a digital input signal that represents an output of the amplitude limiter;

estimating an amplitude modulation component as a function of the digital input signal; and generating the equalized signal by modifying the digital input signal as a function of the estimated amplitude modulation component.

2. The method of claim 1, wherein the step of estimating the amplitude modulation component as a function of the digital input signal comprises:

generating a filtered signal by filtering the digital input signal in accordance with a filtering characteristic that is substantially identical to a filtering characteristic of the first receive filter; and generating the estimated amplitude modulation component by measuring the amplitude of the filtered signal.

3. The method of claim 2, wherein the step of generating the equalized signal by modifying the digital input signal as a function of the estimated amplitude modulation component comprises:

generating a delayed input signal from the digital input signal; and generating the equalized signal by amplitude modulating the delayed input signal with the estimated amplitude modulation component.

4. The method of claim 3, wherein an amount of delay between the delayed input signal and the digital input signal is one half the length of an impulse response associated with the step of generating the filtered signal.

5. The method of claim 2, wherein the step of generating the equalized signal by modifying the digital input signal as a function of the estimated amplitude modulation component comprises:

generating a non-linear signal from the estimated amplitude modulation component;

generating a delayed input signal from the digital input signal; and generating the equalized signal by amplitude modulating the delayed input signal with the non-linear signal.

6. The method of claim 5, wherein the step of generating the non-linear signal comprises generating a signal that is representative of an arcsin of the estimated amplitude modulation component.

7. The method of claim 5, wherein an amount of delay between the delayed input signal and the digital input signal is one half the length of an impulse response associated with the step of generating the filtered signal.

8. The method of claim 5, further comprising:

generating a multiplied signal by multiplying the estimated amplitude modulation component by a constant, K; and using the multiplied signal as the estimated amplitude modulation component in the non-linear signal generating step.

9. The method of claim 8, wherein a value of the constant K is set such that when an unmodulated carrier is received by the receiver, the non-linear signal has a value of "1".

10. The method of claim 8, further comprising:

generating a clipped signal by preventing a magnitude of the multiplied signal from exceeding a predefined value; and using the clipped signal as the multiplied signal in the non-linear signal generating step.

11. The method of claim 2, wherein the filtering characteristic is a root cosine response.

12. A method of receiving a phase shift keying modulated signal, the method comprising:

generating an amplitude limited signal from an intermediate frequency signal;

generating a digital signal from the amplitude limited signal;

generating an equalized signal from the digital signal;

generating a first filtered signal by filtering the equalized signal; and using a phase shift keying demodulator to demodulate the first filtered signal, wherein the step of generating the equalized signal comprises:

estimating an amplitude modulation component as a function of the digital signal; and generating the equalized signal by modifying the digital signal as a function of the estimated amplitude modulation component.

13. The method of claim 12, wherein the step of estimating the amplitude modulation component as a function of the digital signal comprises:
generating a second filtered signal by filtering the digital signal in accordance with a filtering characteristic that is substantially identical to a filtering characteristic used to generate the first filtered signal; and
generating the estimated amplitude modulation component by measuring the amplitude of the second filtered signal.

14. The method of claim 13, wherein the step of generating the equalized signal by modifying the digital signal as a function of the estimated amplitude modulation component comprises:
generating a delayed digital signal from the digital signal; and
generating the equalized signal by amplitude modulating the delayed digital signal with the estimated amplitude modulation component.

15. The method of claim 14, wherein an amount of delay between the delayed digital signal and the digital signal is one half the length of an impulse response associated with the step of generating the second filtered signal.

16. The method of claim 13, wherein the step of generating the equalized signal by modifying the digital signal as a function of the estimated amplitude modulation component comprises:
generating a non-linear signal from the estimated amplitude modulation component;
generating a delayed digital signal from the digital signal; and
generating the equalized signal by amplitude modulating the delayed digital signal with the non-linear signal.

17. The method of claim 16, wherein the step of generating the non-linear signal comprises generating a signal that is representative of an arcsin of the estimated amplitude modulation component.

18. The method of claim 16, wherein an amount of delay between the delayed digital signal and the digital signal is one half the length of an impulse response associated with the step of generating the second filtered signal.

19. The method of claim 16, further comprising:
generating a multiplied signal by multiplying the estimated amplitude modulation component by a constant, K; and
using the multiplied signal as the estimated amplitude modulation component in the non-linear signal generating step.

20. The method of claim 19, wherein a value of the constant K is set such that when an unmodulated carrier is being received, the non-linear signal has a value of "1".

21. The method of claim 19, further comprising:
generating a clipped signal by preventing a magnitude of the multiplied signal from exceeding a predefined value; and
using the clipped signal as the multiplied signal in the non-linear signal generating step.

22. The method of claim 13, wherein the filtering characteristic is a root cosine response.

23. An equalizer for supplying an equalized signal to a first receive filter in a receiver, wherein the receiver includes an amplitude limiter and the first receive filter, the equalizer comprising:
an input for receiving a digital input signal that represents an output of the amplitude limiter;
an amplitude estimator that estimates an amplitude modulation component as a function of the digital input signal; and
an output stage that generates the equalized signal by modifying the digital input signal as a function of the estimated amplitude modulation component.

24. The equalizer of claim 23, wherein the amplitude estimator comprises:
a second receive filter, coupled to receive the digital input signal, wherein the second receive filter generates a filtered signal by filtering the digital input signal in accordance with a filtering characteristic that is substantially identical to a filtering characteristic of the first receive filter; and
an amplitude measuring circuit that generates the estimated amplitude modulation component by measuring the amplitude of the filtered signal.

25. The equalizer of claim 24, wherein the output stage comprises:
a delay circuit that generates a delayed input signal from the digital input signal; and
an amplitude modulator that generates the equalized signal by amplitude modulating the delayed input signal with the estimated amplitude modulation component.

26. The equalizer of claim 25, wherein an amount of delay generated by the delay circuit is one half the length of an impulse response associated with the second receive filter.

27. The equalizer of claim 24, wherein the output stage comprises:
a non-linearity circuit that generates a non-linear signal from the estimated amplitude modulation component;
a delay circuit that generates a delayed input signal from the digital input signal; and
an amplitude modulator that generates the equalized signal by amplitude modulating the delayed input signal with the non-linear signal.

28. The equalizer of claim 27, wherein the non-linearity circuit comprises an arcsin circuit that generates a signal that is representative of an arcsin of the estimated amplitude modulation component.

29. The equalizer of claim 27, wherein an amount of delay generated by the delay circuit is one half the length of an impulse response associated with the second receive filter.

30. The equalizer of claim 27, further comprising:
a multiplier, interposed between the amplitude measuring circuit and the non-linearity circuit, wherein the multiplier generates a multiplied signal by multiplying the estimated amplitude modulation component by a constant, K, and supplies the multiplied signal to the non-linearity circuit for use as the estimated amplitude modulation component.

31. The equalizer of claim 30, wherein a value of the constant K is set such that when an unmodulated carrier is received by the receiver, the non-linear signal has a value of "1".

32. The equalizer of claim 30, further comprising:
a clipping circuit, interposed between the multiplier and the non-linearity circuit, wherein the clipping circuit generates a clipped signal by preventing a magnitude of the multiplied signal from exceeding a predefined value, and supplies the clipped signal to the non-linearity circuit for use as the multiplied signal.

33. The equalizer of claim 24, wherein the first and second receive filters are root cosine filters.

34. A receiver for receiving a phase shift keying modulated signal, the receiver comprising:
- a limiter that generates an amplitude limited signal from an intermediate frequency signal;
- an analog-to-digital converter that generates a digital signal from the amplitude limited signal;
- an equalizer that generates an equalized signal from the digital signal;
- a first receive filter that generates a first filtered signal by filtering the equalized signal; and
- a phase shift keying demodulator that demodulates the first filtered signal,
- wherein the equalizer comprises:
  - an amplitude estimator that estimates an amplitude modulation component as a function of the digital signal; and
  - an output stage that generates the equalized signal by modifying the digital signal as a function of the estimated amplitude modulation component.

35. The receiver of claim 34, wherein the amplitude estimator comprises:
- a second receive filter, coupled to receive the digital signal, wherein the second receive filter generates a second filtered signal by filtering the digital signal in accordance with a filtering characteristic that is substantially identical to a filtering characteristic of the first receive filter; and
- an amplitude measuring circuit that generates the estimated amplitude modulation component by measuring the amplitude of the second filtered signal.

36. The receiver of claim 35, wherein the output stage comprises:
- a delay circuit that generates a delayed digital signal from the digital signal; and
- an amplitude modulator that generates the equalized signal by amplitude modulating the delayed digital signal with the estimated amplitude modulation component.

37. The receiver of claim 36, wherein an amount of delay generated by the delay circuit is one half the length of an impulse response associated with the second receive filter.

38. The receiver of claim 35, wherein the output stage comprises:
- a non-linearity circuit that generates a non-linear signal from the estimated amplitude modulation component;
- a delay circuit that generates a delayed digital signal from the digital signal; and
- an amplitude modulator that generates the equalized signal by amplitude modulating the delayed digital signal with the non-linear signal.

39. The receiver of claim 38, wherein the non-linearity circuit comprises an arcsin circuit that generates a signal that is representative of an arcsin of the estimated amplitude modulation component.

40. The receiver of claim 38, wherein an amount of delay generated by the delay circuit is one half the length of an impulse response associated with the second receive filter.

41. The receiver of claim 38, further comprising:
- a multiplier, interposed between the amplitude measuring circuit and the non-linearity circuit, wherein the multiplier generates a multiplied signal by multiplying the estimated amplitude modulation component by a constant, K, and supplies the multiplied signal to the non-linearity circuit for use as the estimated amplitude modulation component.

42. The receiver of claim 41, wherein a value of the constant K is set such that when an unmodulated carrier is being received, the non-linear signal has a value of "1".

43. The receiver of claim 41, further comprising:
- a clipping circuit, interposed between the multiplier and the non-linearity circuit, wherein the clipping circuit generates a clipped signal by preventing a magnitude of the multiplied signal from exceeding a predefined value, and supplies the clipped signal to the non-linearity circuit for use as the multiplied signal.

44. The receiver of claim 35, wherein the first and second receive filters are root cosine filters.

* * * * *

UNITED STATES PATENT AND TRADEMARK OFFICE
CERTIFICATE OF CORRECTION

PATENT NO. : 6,873,663 B1
DATED : March 29, 2005
INVENTOR(S) : Gary Shipton

It is certified that error appears in the above-identified patent and that said Letters Patent is hereby corrected as shown below:

Column 1,
Line 37, change "rst" to -- first --.
Line 41, change "propagates, the" to -- propagates the --.

Column 3,
Line 67, change "(I): and" to -- (I) and --.

Column 4,
Line 1, change "component's." to -- components. --.
Line 40, change "arcsino" to -- arcsin() --.

Column 5,
Line 19, delete "F".

Signed and Sealed this

Thirtieth Day of August, 2005

JON W. DUDAS
*Director of the United States Patent and Trademark Office*